TRAILER

Filed Sept. 13, 1965

INVENTOR
JERRY D. HANSON
BY Dick, Zarley, McKee & Thomte
ATTORNEYS 3,348,712
TRAILER
Jerry D. Hanson, 201 Court Ave., Eagle Grove, Iowa 50533
Filed Sept. 13, 1965, Ser. No. 486,867
9 Claims. (Cl. 214—396)

ABSTRACT OF THE DISCLOSURE

A lifting frame including horizontally spaced apart pulleys, a hydraulic cylinder mounted on the frame having a pair of pulleys at opposite ends and an anchorage pulley intermediate its ends, a length of cable extending over the anchorage pulley thence over the pair of pulleys on one end of the hydraulic cylinder, thence over the pulleys at the opposite end of the hydraulic cylinder and finally the free ends of the cable extending over one of the pulleys horizontally mounted on the frame.

Various lifting assemblies have been used heretofore for raising a load off of the ground for transporting and then returning the load to the ground when the vehicle has reached its destination.

Accordingly it is a principal object of this invention to provide a trailer having an improved loading and unloading apparatus for vehicles.

A related object of this invention is to provide a load lifting apparatus which employs a single length of cable having ends which are maintained in a common horizontal plane at all times during the raising and lowering procedure.

A still further related object of this invention is to provide a lifting apparatus for a trailer wherein a pair of movable pulleys may be adjustably positioned lengthwise of the trailer frame to accommodate loads having various lengths while still maintaining the ends of the cable in a common horizontal plane in all positions of adjustment.

A still further related object of this invention is to provide a lifting apparatus for a vehicle wherein the power means is positioned at one end of the vehicle and movable collars or trolleys are disposed on a rail extending lengthwise of the trailer and a single length of cable is connected to said hydraulic means with its ends extending over the trolley pulleys adjacent opposite ends of the load and as long as the trolleys are moved an equal distance in opposite directions from each other the ends of the cable will remain in a common plane.

A still further object of this invention is to provide a lift apparatus for a vehicle wherein there is a mechanical advantage in the distance the ends of the cable move over the distance the hydraulic piston moves.

A still further object of this invention is to provide a lift apparatus for a vehicle which is automatically and continuously self-adjusting to maintain the load in a desired raised position along its entire length.

A still further object of this invention is to provide a lift apparatus having a power means including a hydraulic cylinder piston for operating a length of cable wherein pulleys are so arranged to equally distribute the forces on the hydraulic power means to avoid excessive stresses.

A further object of this invention is to provide a trailer which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figures 1, 2, 3:
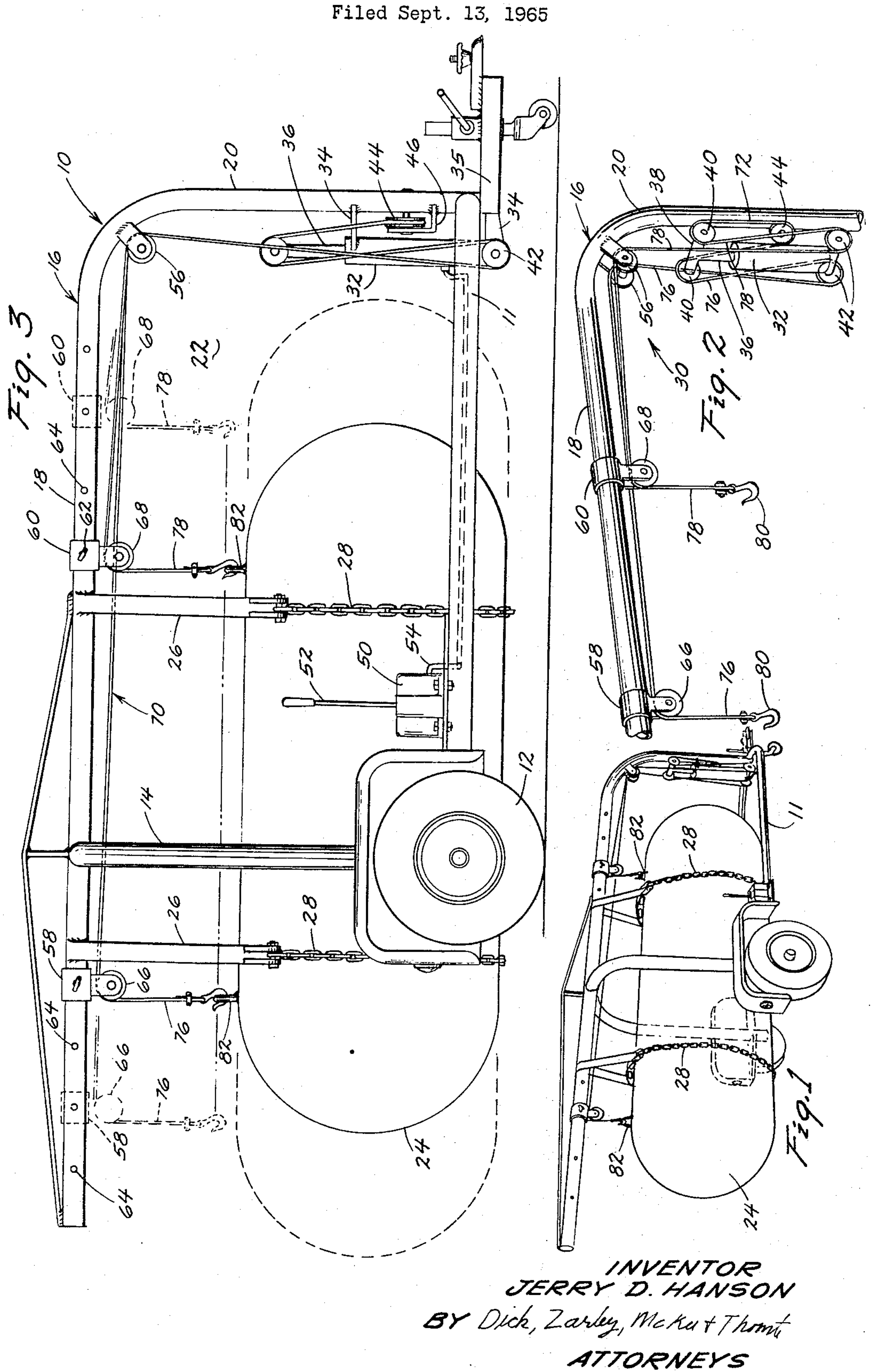
FIG. 1 is a perspective view of the trailer device including the lift apparatus holding a storage tank in a raised position.
FIG. 2 is a fragmentary perspective view of the lift apparatus only as it is mounted on the implement frame.
FIG. 3 is an enlarged side elevation view of the vehicle of FIG. 1 and additionally showing the lift apparatus at different elevations and different size loads being carried by the vehicle.

As seen in the drawings, a trailer 10 includes a frame having a lower U-shaped horizontally disposed portion 11 with wheels 12 at the rear free ends thereof. An inverted U-shaped frame portion 14 is disposed in a vertical plane adjacent the wheels 12 and secured at its free ends to the free ends of the U-shaped portion 11. A third frame portion 16 which is L-shaped has an overhead horizontally disposed portion 18 which intersects the bight area of the frame portion 14 and a vertical portion 20 which intersects the bight area of the frame portion 11. Thus, an open area 22 is defined between the frame portions 11, 14 and 16 in which a load such as a storage tank 24 may be straddled.

A pair of slings 26 are positioned on opposite sides of the frame portion 14 and are provided with lengths of chain 28 to embrace the storage container 24 after it has been raised to its travel position by the lift apparatus.

The lift apparatus is generally referred to in FIG. 2 by the reference numeral 30. A hydraulic cylinder 32 is fixedly secured at its lower end by a support element 34 to the frame of the trailer and in particular to a tongue structure 35 which in turn is connected to the bight portion of the frame 11 and the lower end of the frame portion 20. The upper end of the cylinder 32 is secured to the vertical frame portion 20 by plate element 34 and thus the cylinder 32 is disposed in a vertical position and in parallel relationship to the frame portion 20 at the forward end of the trailer 10 ahead of the storage tank 24. A piston rod 36 extends from the cylinder 32 and is provided with a T-shaped end portion 38 having a pair of pulleys 40 on its opposite lateral ends. The pulleys 40 are equally spaced from the longitudinal center axis of the piston rod 36 to equally distribute the load on the piston rod 36. A second pair of pulleys 42 are mounted on opposite sides of the cylinder 32 at its lower end and are in alignment with the pulleys 40 on the piston rod 36. A single anchor pulley 44 is positioned by an L-shaped bracket 46 on the inner side of the vertical frame portion 20 and adjacent the cylinder 32 intermediate its length and between the pair of pulleys 40 and the pair of pulleys 42.

A hydraulic pump 50 is mounted on the side of the trailer frame portion 11 and has a handle actuating member 52. A hydraulic fluid line 54 extends between the pump 50 and the cylinder 32.

Directly above the two pair of pulleys 40 and 42 a pair of pulleys 56 are disposed and secured to the corner portion of the frame 16. A pair of movable collars 58 and 60 are mounted on the horizontally disposed frame portion 18 and may be selectively locked in various positions by a pin 62 extending through the collar and openings 64 in the frame portion 18. A single pulley 66 is secured to the collar 58 and similarly a single pulley 68 is secured to the collar 60 and disposed in substantial alignment with the pair of pulleys 56.

A length of cable 70 has an intermediate portion 72 which extends over the anchor pulley 44 and then branches off into two end portions 76 and 78 which pass over pulleys 40 on the end of the piston rod 36. Next, the end portions 76 and 78 extend around the lower pulleys 42 and back up over the pair of pulleys 56 and rearwardly along the overhead frame portion 18 where the cable portion 78 passes over the forward pulley 68 and the other end portion 76 of the cable passes over the rear pulley 66. A hook 80 is provided on the free ends of the end portions 76 and 78 for engagement with eye elements 82 on the tank 24.

Thus it is seen in operation that the piston rod 36 upon being extended raises the cable end portions 76 and 78 and when lowered lowers the end portions 76 and 78. The weight of the piston rods 76 and 78 along with the pulleys 40 and the cable will tend to normally push the piston to its lowermost position and consequently lower the cable ends 76 and 78 for engagement with the hooks 82 on the tank 24 which initially is resting on the ground in the chamber 22 defined by the frame of the trailer 10. Upon actuation of the hydraulic pump lever 52 the piston rod 36 is extended and the tank 24 will be raised whereby the chains 28 may be extended around the tank 24 and locked into position by the tank engaging the slings 26. Upon reaching the destination, the chains 28 are released and the fluid pressure on the cylinder is removed whereby the tank will automatically be lowered as the piston 36 is retracted into the cylinder 32. It is to be appreciated that for every inch the piston rod 36 moves the cable end portions 76 and 78 move two inches thereby giving a mechanical advantage distance relationship of the ends of the cable to the piston rod of two to one.

It is also important to note that regardless of the length of the tank 24 and the consequential positioning of the collars 58 and 60 and the cable end portions 76 and 78 to accommodate the various sized tanks 24, the cable ends 76 and 78 will remain in the same horizontal plane regardless of whether the tank is short or long as seen by the small tank in the solid lines and the larger tank in the dash lines and the corresponding cable end portions 76 and 78 of the solid dash line positions in FIG. 3. This uniformity in elevation is possible by virtue of the fact that as the collar 58 is moved outwardly additional cable is required but at the same time the collar 60 is moved inwardly an equal distance and gives up the same amount of cable that is required for moving the collar 58 outwardly and consequently the cable ends are able to remain in the same horizontal plane regardless of the distance the cable ends are spaced apart horizontally as long as they are moved an equal distance in opposite directions from each other.

It is also to be appreciated that minimum stress and strain is placed on the hydraulic cylinder 32 in the shaft 36 by the alignment of the pair of pulleys 40 and the pulleys 42 with the pulleys 56 on the frame 16.

Some changes may be made in the construction and arrangement of my trailer without departing from the real spirit and purpose of my invention, and it is my intention to cover by my claims, any modified forms of structure or use of mechanical equivalents which may be reasonably included within their scope.

I claim:

1. In a vehicle, the combination of a frame including an overhead lengthwise extending frame member and a vertically disposed forward end frame member, a hydraulic cylinder mounted on said forward end frame member and having a piston rod carrying pulley means, a pair of collar means lengthwise adjustably mounted and spaced apart on said overhead frame member and each carrying a pulley, a length of cable connected between its ends to said pulley means on said piston rod and one end of said cable extending over one of said collar pulleys and the other end extending over the other of said collar pulleys, and means for supplying said cylinder with pressure fluid, an anchorage pulley is fixed to said frame adjacent said cylinder, and said pulley means on said piston rod including a pair of pulleys, said anchorage pulley fixed to said frame being disposed below said pair of pulleys on said piston rod and said cable extending over said anchorage pulley with its ends extending over one said pair of pulleys on said piston rod, and a second pair of pulleys are provided below said first pair of pulleys and each engage one of said cable ends between said collar pulleys and said first pair of pulleys on said piston rod.

2. The structure of claim 1 and said first and second pair of pulleys are equally spaced apart on opposite sides of the longitudinal center axis of said cylinder to balance the lateral forces on said piston rod and cylinder.

3. In a vehicle, the combination of a frame including an overhead lengthwise extending frame member and a vertically disposed forward end frame member, a hydraulic cylinder mounted on said forward end frame member and having a piston rod carrying pulley means, a pair of collar means lengthwise adjustably mounted and spaced apart on said overhead frame member and each carrying a pulley, a length of cable connected between its ends to said pulley means on said piston rod and one end of said cable extending over one of said collar pulleys and the other end extending over the other of said collar pulleys, and means for supplying said cylinder with pressure fluid, said pulley means on said piston rod includes a pair of pulleys, and a pair of pulleys mounted on said cylinder, and a single stationary pulley disposed between said pair of pulleys on said piston rod and said pulleys on said cylinder, said length of cable being further defined as having its intermediate portion extending over said single pulley, thence the opposite ends over said pair of pulleys on said piston rod, thence over the pair of pulleys on said cylinder, and finally to the respective collar pulleys.

4. The structure of claim 3 wherein the mechanical advantage distance relationship of said ends of said length of cable to said piston rod is two to one.

5. In a vehicle, the combination of a frame including an overhead lengthwise extending frame member and a vertically disposed forward end frame member, a hydraulic cylinder mounted on said frame and having a piston rod carrying pulley means, a pair of pulley means mounted and spaced apart on said overhead frame member, a length of cable connected between its ends to said pulley means on said piston rod and one end of said cable extending over one of said pulleys and the other end extending over the other of said pulleys, and means for supplying said cylinder with pressure fluid, an anchorage pulley is fixed to said frame adjacent said cylinder, and said pulley means on said piston rod including a pair of pulleys, said anchorage pulley fixed to said frame being disposed such that said pair of pulleys on said piston rod move away when said piston rod is extended and said cable extends over said anchorage pulley with its ends extending over one of said pair of pulleys on said piston rod, and a second pair of pulleys are provided adjacent said first pair of pulleys and each engage one of said cable ends between said collar pulleys and said first pair of pulleys on said piston rod.

6. In a vehicle, the combination of a frame including an overhead lengthwise extending frame member and a vertically disposed forward end frame member, a hydraulic cylinder mounted on said frame and having a piston rod carrying pulley means, a pair of pulley means mounted and spaced apart on said overhead frame member, a length of cable connected between its ends to said pulley means on said piston rod and one end of said cable extending over one of said pulleys and the other end extending over the other of said pulleys, and means for supplying said cylinder with pressure fluid, said pulley means on said piston rod includes a pair of pulleys, and a pair of pulleys mounted on said cylinder, and a single stationary pulley disposed between said pair of pulleys on said piston rod and said pulleys on said cylinder, said length of cable being further defined as having its intermediate portion extending over said single pulley, thence the opposite ends over said pair of pulleys on said piston rod, thence over the pair of pulleys on said cylinder, and finally to the respective pulleys on said frame.

7. The structure of claim 6 wherein said pulleys on said overhead frame member are adjustably connected thereto to be selectively positioned lengthwise of said frame member.

8. The structure of claim 6 wherein said hydraulic cylinder is mounted on said forward end frame member with said piston rod extending upwardly.

9. The structure of claim 7 wherein lifting hooks are provided on the free ends of said cable and said hooks are continuously disposed in a common horizontal plane as each of said pulleys are moved an equal distance outwardly relative to each other or are moved inwardly an equal distance relative to each other.

References Cited

UNITED STATES PATENTS

| | | | |
|---|---|---|---|
| 2,772,010 | 11/1956 | Buehring | 214—394 |
| 2,943,886 | 7/1960 | Wilkinson | 254—189 X |
| 3,028,030 | 4/1962 | Wylie | 214—396 |

HUGO O. SCHULZ, *Primary Examiner.*

ALBERT J. MAKAY, *Examiner.*